US006854170B1

(12) United States Patent
D'Aguanno

(10) Patent No.: US 6,854,170 B1
(45) Date of Patent: Feb. 15, 2005

(54) METHOD AND APPARATUS FOR REMOVING A GOLF CLUB HEAD FROM A GOLF CLUB SHAFT

(75) Inventor: Frank D'Aguanno, Feasterville, PA (US)

(73) Assignee: D & T Golf Ventures, Woodlands, TX (US)

( * ) Notice: Subject to any disclaimer, the term of this patent is extended or adjusted under 35 U.S.C. 154(b) by 7 days.

(21) Appl. No.: 09/676,627

(22) Filed: Oct. 2, 2000

Related U.S. Application Data

(63) Continuation-in-part of application No. 09/427,461, filed on Oct. 22, 1999, now abandoned.
(60) Provisional application No. 60/106,223, filed on Oct. 30, 1998.

(51) Int. Cl.[7] .................................................. B23P 11/02
(52) U.S. Cl. ........................................... 29/239; 29/252
(58) Field of Search .......................... 29/252, 251, 239, 29/234, 235, 237, 238, 280, 423, 450, 426.5, 256, 263, 255, 261, 270

(56) References Cited

U.S. PATENT DOCUMENTS

| | | | | |
|---|---|---|---|---|
| 2,680,287 A | | 6/1954 | Wilson | |
| 2,952,131 A | | 9/1960 | Lyroudias | |
| 3,317,185 A | | 5/1967 | Burk et al. | |
| 3,711,920 A | | 1/1973 | Simmons, Jr. | |
| 3,855,842 A | | 12/1974 | Imabori et al. | |
| 3,858,846 A | | 1/1975 | Schmid | |
| 3,973,315 A | | 8/1976 | Thanghe | |
| 4,169,595 A | | 10/1979 | Kaugars | |
| 4,558,863 A | | 12/1985 | Haas et al. | |
| 4,657,225 A | | 4/1987 | Hoehn et al. | |
| 4,682,504 A | | 7/1987 | Kobayashi | |
| 4,899,430 A | * | 2/1990 | Farino | 29/240 |
| 4,901,418 A | * | 2/1990 | Machado et al. | 29/263 |
| 4,910,849 A | * | 3/1990 | Marshall | 29/239 |
| 4,958,834 A | | 9/1990 | Colbert | |
| 5,040,279 A | | 8/1991 | Braly | |
| 5,429,008 A | | 7/1995 | Matsumoto et al. | |
| 5,429,358 A | * | 7/1995 | Rigal et al. | 273/80.3 |
| 5,590,452 A | | 1/1997 | Mead | |
| 5,722,140 A | * | 3/1998 | Marshall | 29/263 |
| 5,839,181 A | * | 11/1998 | Chu | 29/281.5 |
| 5,870,815 A | | 2/1999 | Karner et al. | |
| 5,943,767 A | * | 8/1999 | Milam | 29/256 |
| 5,976,028 A | | 11/1999 | Ciccarello | |
| 6,183,375 B1 | | 2/2001 | Weiss | |
| 6,250,168 B1 | | 6/2001 | D'Aguanno | |
| 6,449,823 B2 | * | 9/2002 | Krapp | 29/244 |

OTHER PUBLICATIONS

2002 Golfsmith Clubmaking Catalog, copies of cover and pp. 110–113.
Mitchell Golf Equipment Company—1998 Catalog.

* cited by examiner

*Primary Examiner*—Robert C. Watson
(74) *Attorney, Agent, or Firm*—Charles N. Quinn, Esq.

(57) ABSTRACT

The present invention is a method and apparatus for removing a golf club head from a golf club shaft. A clamping mechanism secures the shaft of the golf club within the apparatus while a force mechanism applies sufficient force against the golf club head to separate the golf club head from the golf club shaft upon the breaking of an epoxy bond securing the golf club head to the golf club shaft. Heat is then applied to the golf club head to release or melt the epoxy bond. Simultaneous with breaking the epoxy bond, the force mechanism detaches the golf club head from the golf club shaft.

14 Claims, 5 Drawing Sheets

METHOD AND APPARATUS FOR REMOVING A GOLF CLUB HEAD FROM A GOLF CLUB SHAFT

RELATED APPLICATIONS

This application is a continuation-in-part (CIP) of applicant's U.S. patent application Ser. No. 09/427,461, filed Oct. 22, 1999, now abandoned entitled "Graphite Golf Shaft Removal Apparatus," which application claims priority to U.S. Provisional Patent Application No. 60/106,223, filed Oct. 30, 1998, entitled "Graphite Golf Shaft Removal Apparatus." The above referenced patent applications are incorporated in their entirety herein by this reference.

FIELD OF THE INVENTION

The present invention relates generally to golf equipment, and more particularly to a method and apparatus for removing a head of a golf club from a shaft of the golf club.

BACKGROUND OF THE INVENTION

The desirability of repairing or customizing golf clubs by removing a head of a golf club from a shaft of the golf club has been recognized for years, and various devices known as shaft removers or shaft pullers exist for this purpose.

Generally, a conventional shaft remover requires that the golf club shaft (most often graphite) be clamped securely in the apparatus. A threaded shaft contained within the apparatus moves a block bearing against the golf club head. The threaded shaft is rotated to apply a slight amount of axial force against the club head. Heat is applied to the club head until the user believes the epoxy bond, securing the golf club head to the shaft, has been broken. If the epoxy bond has broken, further rotation of the threaded shaft applies additional force against the head of the golf club to remove the head from the shaft. If the epoxy bond is not broken, the head will not be forced off of the shaft and more heat must be applied to the club head until the user estimates that the epoxy bond is broken. The threaded shaft is rotated once again, increasing the axial force bearing against the head, to remove the head from the shaft if the epoxy bond has broken.

This method suffers from critical disadvantages. The disadvantages result because the user must estimate the amount of heat to apply to the club head to break the epoxy bond. With conventional devices, the user does not know when the epoxy bond breaks. Intermittent breaks in heating, and a further application of force against the club head, are required to determine whether the epoxy bond has broken. The melting point of shaft epoxy is approximately 250-degrees and the melting point of the resin in a graphite shaft is approximately 350-degrees. If the user underestimates the degree of heat, the head will not separate from the shaft. If the user overestimates the degree of heat, unaware that the epoxy bond has broken, the user risks damaging the shaft by reaching the 350-degree melting point of the graphite shaft resin.

For the foregoing reasons, there is a need for a golf club shaft remover where, prior to heating, the user can knowingly apply a sufficient magnitude of force to the golf club head to detach the head from the shaft simultaneously with the breaking of the epoxy bond, without a further application of force once heating begins.

SUMMARY OF THE INVENTION

The present invention is a method and apparatus that overcomes the critical deficiencies in conventional graphite shaft removers. The golf club shaft remover of the present invention includes a force mechanism that applies a constant and sufficient force against a head of a golf club to detach the head from a shaft of the golf club simultaneously with the breaking of the epoxy bond securing the head to the shaft. Accordingly, the user is relieved of estimating the amount of heat required to break the epoxy bond, which can result in damaging the graphite shaft.

In one aspect of the present invention, the golf club shaft removing apparatus includes a frame, a clamping mechanism connected to the frame for securing the golf club and a force mechanism. The force mechanism is also connected to the frame and includes a hydraulic piston, a hollow shaft, a forcing spring, and a turret.

In another aspect of the present invention, the frame includes a block having a bore through which the hydraulic piston slidably resides. The frame can also include a base, a first upstanding frame portion supporting the clamping mechanism and a second upstanding frame portion supporting the force mechanism.

In another aspect of the present invention, the clamping mechanism includes a threaded clamping screw, a clamping handle to turn the screw, a moving block, and an upper and lower jaw. The upper jaw may reside within the moving block, while the lower jaw may reside within the first upstanding frame portion. The upper and lower jaws engage and secure the golf club shaft.

In another aspect of the present invention, the force mechanism includes a hydraulic cylinder having a hydraulic piston and a piston handle, a hollow shaft connected to the end of the piston, a forcing spring within the hollow shaft and a turret. The force mechanism communicates force to the golf club head via the piston, the hollow shaft, the spring and the turret. The hollow shaft can have an open end and a closed end, the closed end being connected to the distal end of the piston. The forcing spring can have a first end and a second end, with the first end of the spring abutting the interior closed end of the hollow shaft. The turret may have a smaller diameter portion and a larger diameter portion, with the smaller diameter portion inserted in the open end of the hollow shaft abutting the second end of the spring. The larger diameter portion of the turret may be external to the shaft with a slot designed to engage the shaft of the golf club while abutting the head of the golf club. The turret could also include about its periphery multiple slots differing in size to engage a variety of golf club shaft diameters.

In another aspect of the present invention, an alignment spring exists for resisting axial movement of the hollow shaft in response to the force created by the hydraulic piston. The alignment spring may have two ends, one end connected to the frame and the other end connected to the hollow shaft or the turret. Alternatively, one end of the alignment spring is connected within a second bore in the first upstanding portion of the frame, while the second end of the alignment spring is connected to a tab at the distal end of the hollow shaft.

In another of its aspects, this invention provides a method for removing a golf club head from a golf club shaft by securing the shaft of the golf club and introducing a force on the head of the golf club where the force alone is capable of detaching the head of the golf club from the shaft of the golf club upon the breaking of an epoxy bond securing the head of the golf club to the shaft of the golf club. Heat is then applied to the head of the golf club until a temperature is reached sufficient to break the epoxy bond securing the head of the golf club to the shaft of the golf club. Simultaneous with reaching a temperature sufficient to break the epoxy bond, the force detaches the head of the golf club from the shaft of the golf club. The force can be introduced to the head of the golf club by compressing a forcing spring. The force in the compressed spring is alone capable of detaching the head of the golf club from the shaft of the golf club upon heating the head of the golf club to a temperature sufficient to break the epoxy bond. Simultaneous with the breaking of the epoxy bond, the compressed forcing spring expands to move the head of the golf club away from the shaft of the golf club via the turret.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
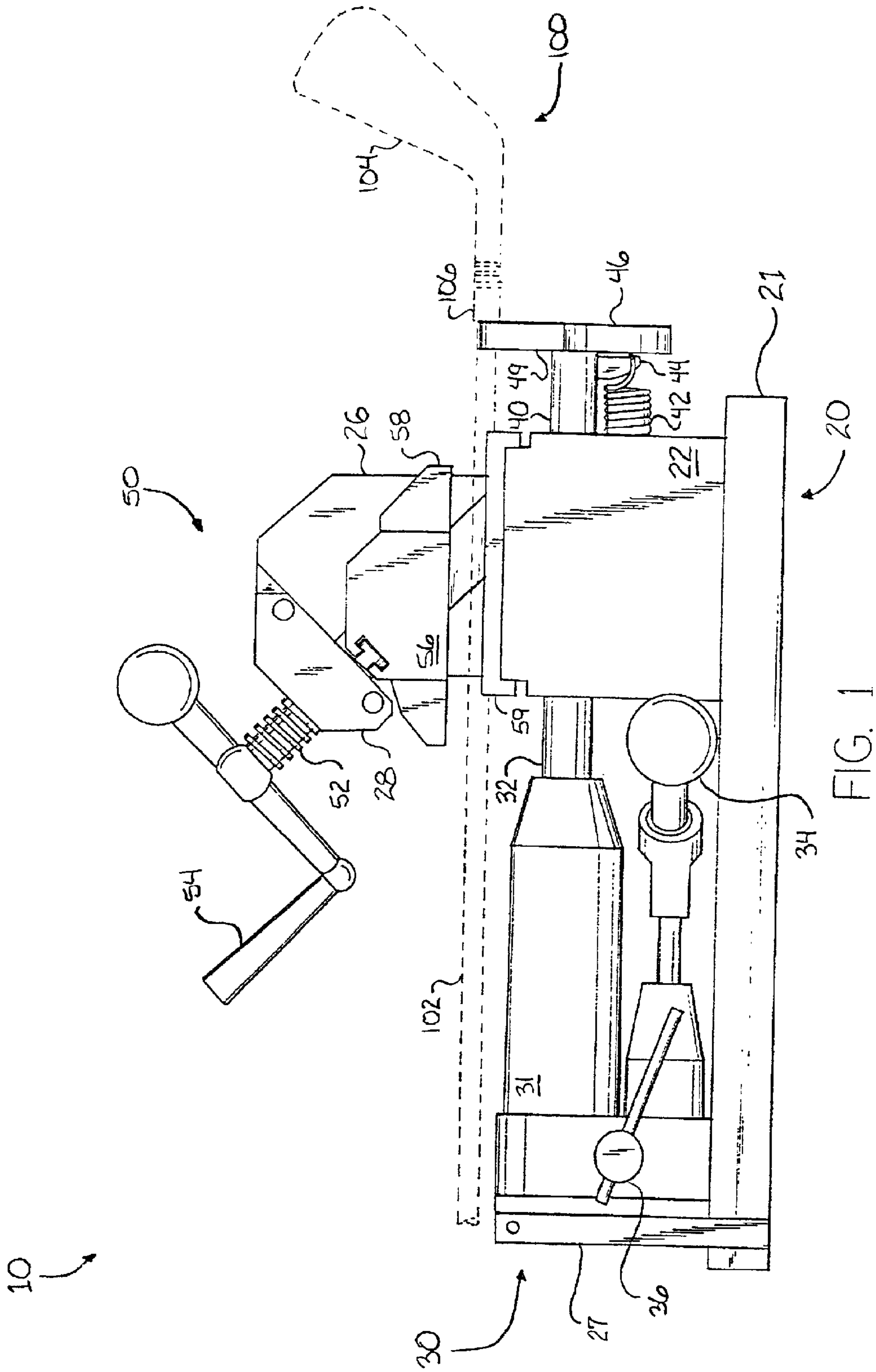
FIG. 1 illustrates a front elevation view of a golf club shaft remover in accordance with the present invention.
Figure 2:
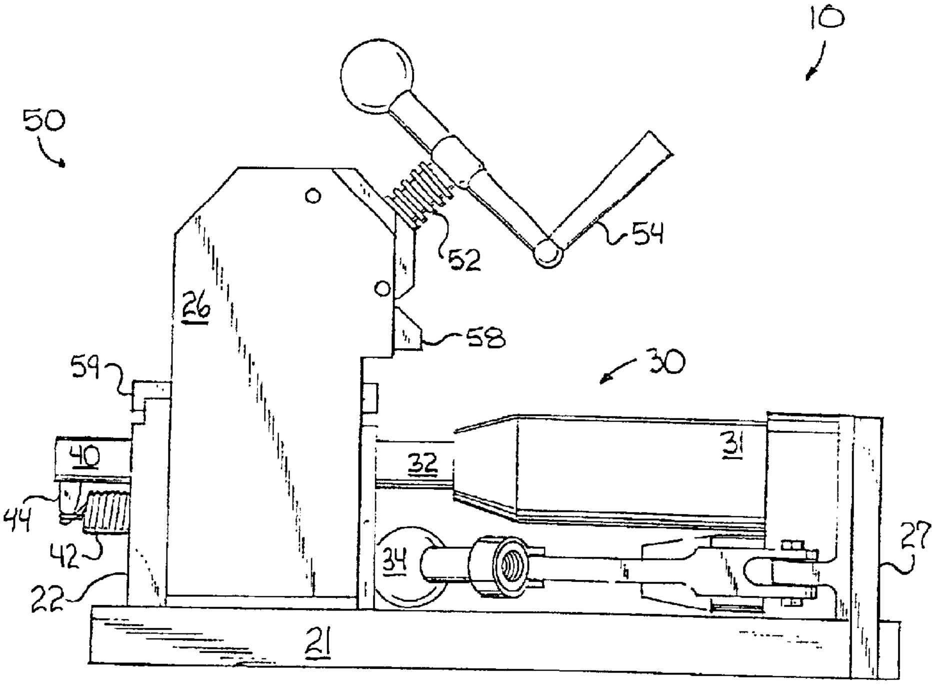
FIG. 2 illustrates a rear elevation view of the golf club shaft remover shown in FIG. 1.
Figure 3:
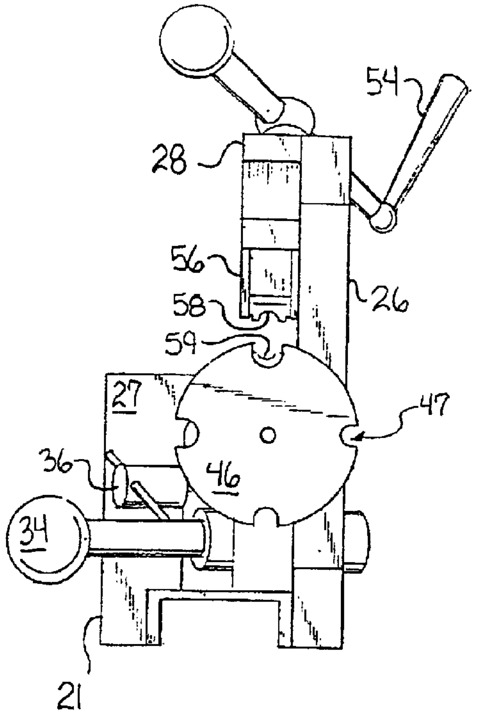
FIG. 3 illustrates a right end elevation view of the golf club shaft remover shown in FIG. 1.
Figure 4:
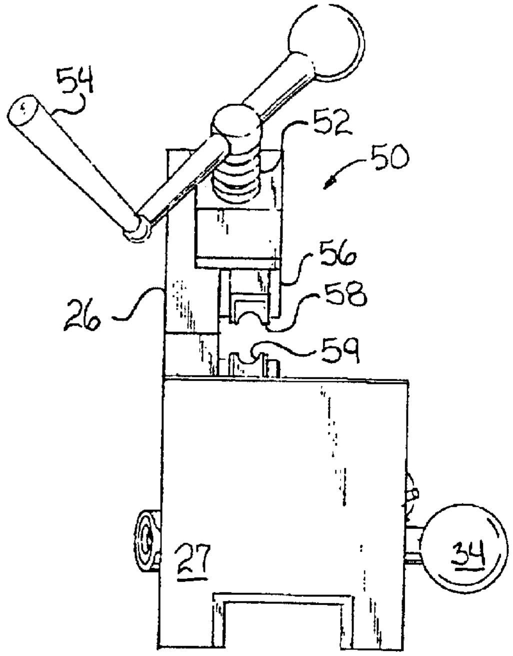
FIG. 4 illustrates a left end elevation view of the golf club shaft remover shown in FIG. 1.
Figure 5:
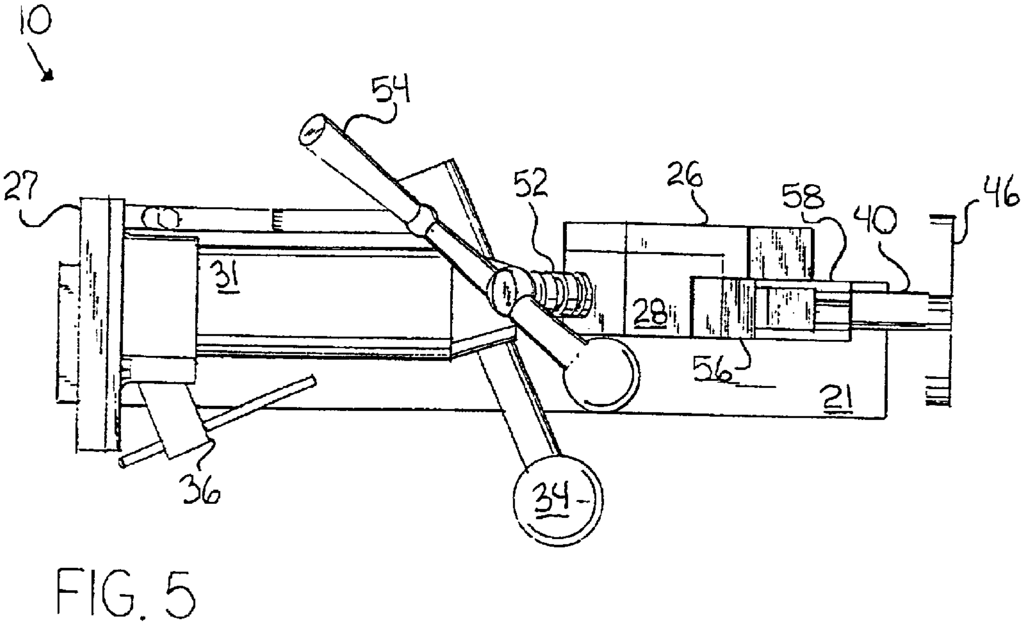
FIG. 5 illustrates a top plan view of the golf club shaft remover shown in FIG. 1.
Figure 6:
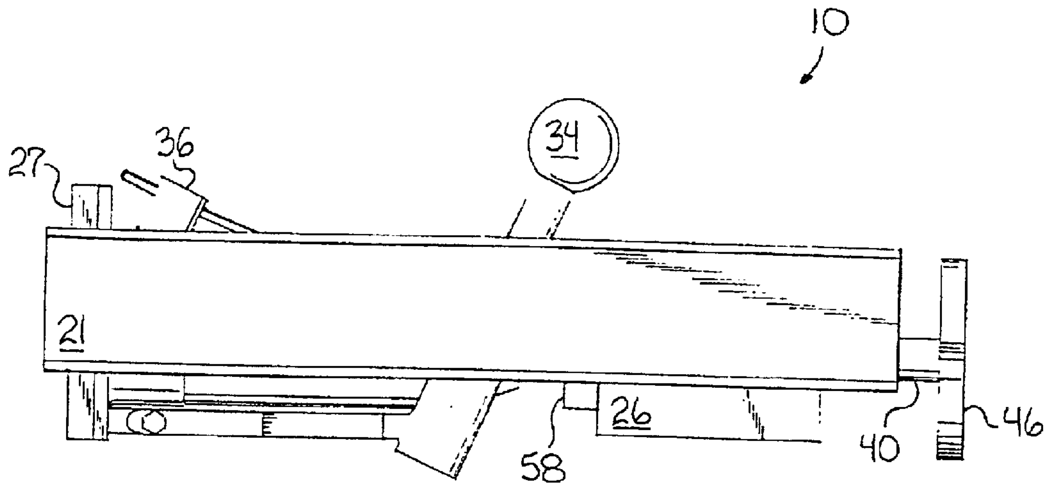
FIG. 6 illustrates a bottom plan view of the golf club shaft remover shown in FIG. 1.

Referring now to the drawings, wherein like numerals indicate like elements, m there is shown in the Figures generally, and especially FIG. 1, an illustration of a golf club shaft remover 10. The golf club shaft remover 10 includes a frame 20, a force mechanism 30, and a clamping mechanism 50. The clamping mechanism 50 secures a golf shaft 102 of a golf club 100 while the force mechanism 30 applies a hydraulic force against a hosel 106 of a head 104 of the golf club 100.

The frame 20 includes a base 21, a block 22, a first upstanding portion 26, a second upstanding portion 27, and a clamping screw support block 28. The first upstanding frame portion 26 supports the clamping mechanism 50, while the second upstanding frame portion 27 supports the force mechanism 30.

The force mechanism 30 includes a hydraulic cylinder 31 having a hydraulic piston 32 and a hydraulic piston handle 34. The hydraulic cylinder 31 can also include a pressure relief valve 36. A hollow shaft 40 is fixedly connected to a distal end of the hydraulic piston 32 (point of connection not shown). The hollow shaft 40 and the piston 32 slidably reside within a bore 24 (not shown in FIG. 1) through the block 22 of the frame 20.

Figure 7:
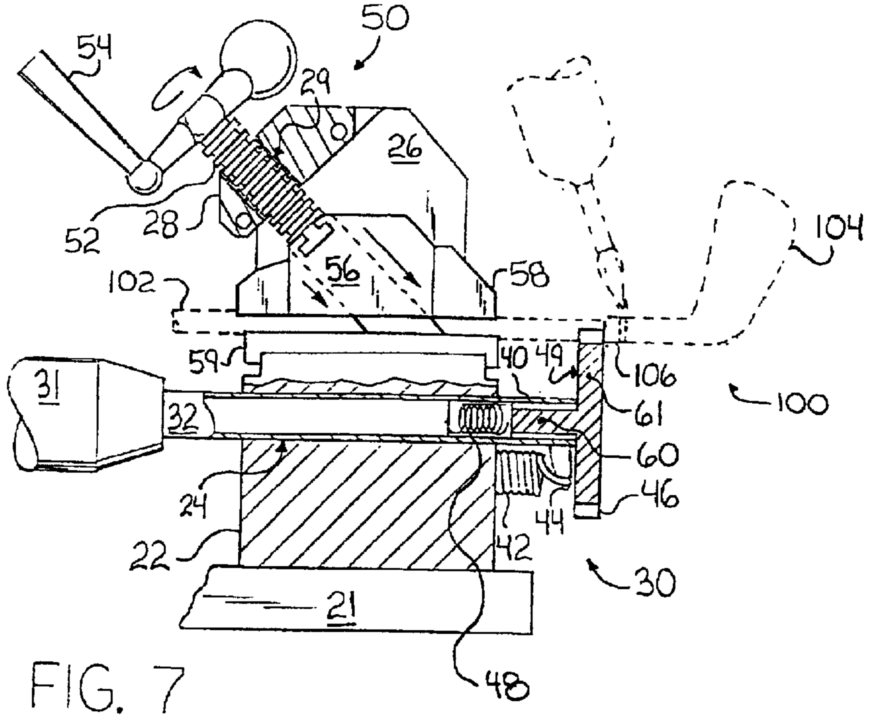
FIG. 7 illustrates a partial front elevation view and partial cross-section view of the golf club shaft remover, in accordance with the present invention, with jaws closed, securing a golf club shaft, and a turret engaging the golf club shaft while applying a force to a golf club head, with a hosel of the golf club head being heated.

Referring to FIG. 7, illustrating a cross-section of the block 22 and showing the bore 24 within the block 22. FIG. 7 also illustrates that the hollow shaft 40 has an open end and a closed end. A forcing spring 48, introduced into the open end, resides within the hollow shaft 40. A first end of the forcing spring 48 abuts the interior closed end of the hollow shaft 40. A turret 46, having a smaller diameter portion 60 and a larger diameter portion 61 partially resides slidably within the open end of the hollow shaft 40. An end of the smaller diameter portion 60 of the turret 46 is introduced into and resides residing within the open end of the hollow shaft 40. The end of the smaller diameter portion 60 of the turret 46 abuts the second end of the forcing spring 48. The larger diameter portion 61 of the turret 46, residing external to the hollow shaft 40, includes a plurality of slots 47 to engage the shaft 102 of the golf club 100 while abutting the head 104 of the golf club 100. The turret 46 is rotatable about the axis of the piston 32 and the hollow shaft 40 to position one of the plurality of differing sized slots 47 into engagement with the shaft 102 of the golf club 100.

Figure 9:
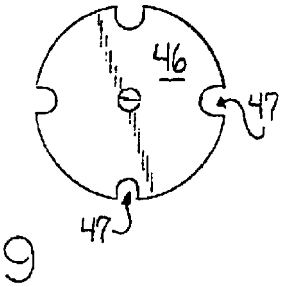
FIG. 9 illustrates an elevation view of a multi-slotted turret in accordance with the present invention.
Figure 10:
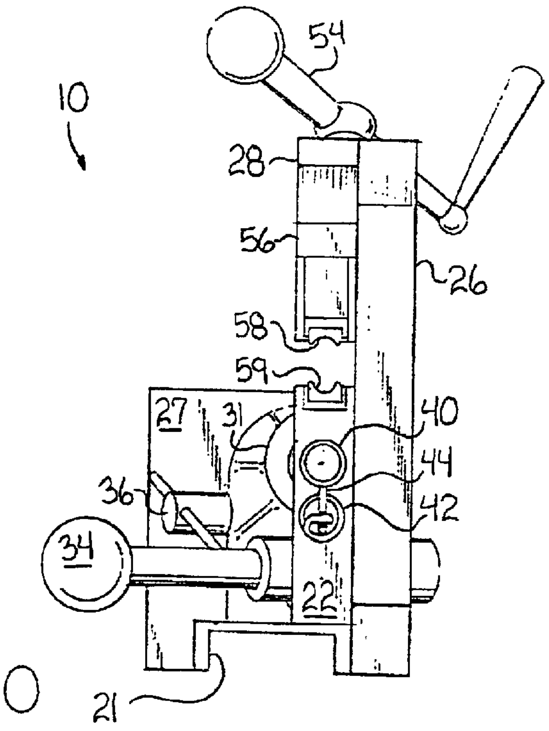
FIG. 10 illustrates a right end elevation view of the golf club shaft remover shown in FIG. 1 without the inclusion of the turret.

FIG. 9 illustrates the turret 46 having multiple slots 47, each differing in size. The various size slots 47 are designed to accommodate golf club shafts of various diameters.

Referring again to the Figures generally, and especially FIG. 1, the golf club shaft remover 10 includes an alignment spring 42 which resists axial movement in the hollow shaft 40 and the piston 32 in response to the hydraulic force created by the force mechanism 30. The alignment spring 42 has a first end (not shown) attached within the block 22 of the frame 20 and a second end attached to a tab 44 on the distal end of the shaft 40.

The clamping mechanism 50 includes an externally threaded clamping screw 52 rotatably residing within a bore 29 (shown in the cross-section of FIG. 7) through the clamping screw support block 28. At one end of the screw 52, a clamping handle 54 is connected to facilitate the rotatable operation of the clamping mechanism 50. The second end of the screw 52 is connected to a moving block 56 housing a movable upper jaw 58. The movable upper jaw 58 secures the shaft 102 against a stationary lower jaw 59, which is removably connected to a top of the block 22. The movable upper jaw 58 and the stationary lower jaw 59 can be removed and replaced with jaws of different size to accommodate golf club shafts of various diameter.

In operation, a golf club 100 is inserted into the golf club shaft remover 10 with its shaft 102 placed within the stationary lower jaw 59 and its hosel 106 bearing against an appropriately sized slot 47 in the rotatable turret 46, as shown in FIG. 1. Referring now to FIG. 7, the clamping handle 54 is rotated in a clockwise direction to threadably move the clamping screw 52 in a 45-degree direction relative to the horizontal through the internally threaded bore 29 in the clamping screw support block 28. The clockwise rotation (as shown by the arrow) of the clamping screw 52 drives the moving block 56 toward the shaft 102 of the golf club 100 until the movable upper jaw 58 engages and securely clamps the shaft 102 of the golf club 100 against the stationary lower jaw 59.

The hydraulic piston handle 34 is manually and pivotally pumped to drive the piston 32 horizontally toward the head 104 of the golf club 100, applying a force against the head of 104 of the golf club 100 via the piston 32, the hollow shaft 40, the forcing spring 48 and the turret 46. The turret 46, bearing against the hosel 106, is resistant to the horizontal movement of the piston 32 and the hollow shaft 40 toward the head 104 of the golf club 100. The continual application of this hydraulic force drives the hollow shaft 40 toward the interior wall 49 of the turret 46, compressing the forcing spring 48. Upon reaching the maximum compression of the forcing spring 48, where the distal end of the hollow shaft 40 touches the interior wall 49 of the turret 46 (as shown in FIG. 7), sufficient potential energy exists in the coiled forcing spring 48 to detach the head 104 of the golf club 100 from the shaft 102 upon the breaking of the epoxy bond securing the head 104 to the shaft 102 of the golf club 100.

During the application of horizontal hydraulic force to compress the forcing spring 48, alignment spring 42 prevents axial movement in the hollow shaft 40 and the piston 32, which if allowed to occur could prevent the complete compression of the forcing spring 48.

Figure 8:
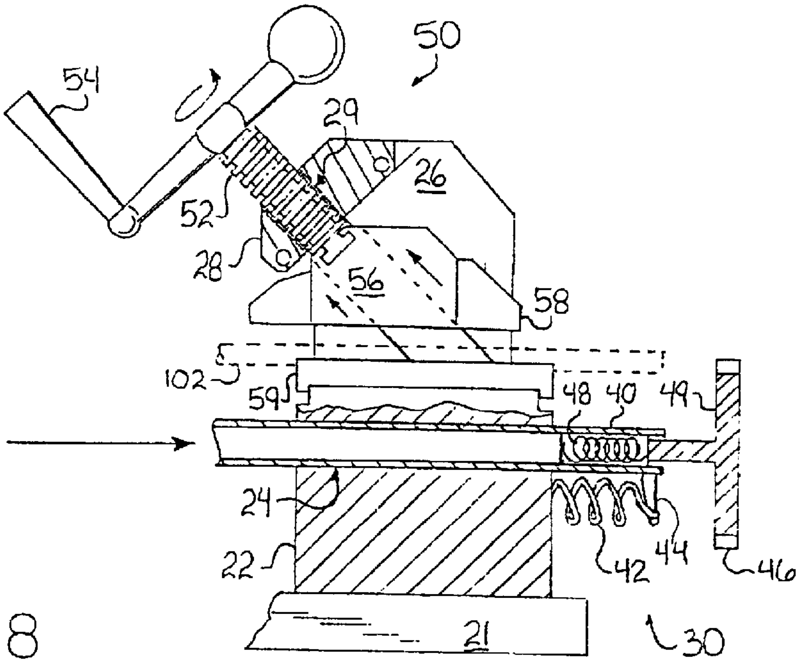
FIG. 8 illustrates a front elevation view of the golf club shaft remover in accordance with the present invention with jaws in an open position after a golf club head has been removed from a golf club shaft.

Heat is then applied to the hosel 106 of the head 104 of the golf club 100, usually by propane torch or heat gun (as shown in FIG. 7), until the epoxy bond securing the head 104 to the shaft 102 of the golf club 100 releases or melts. Simultaneous with the breaking of the epoxy bond, the compressed forcing spring 48 expands to drive the turret 46 toward the head 104 of the golf club 100 to remove the head 104 from the shaft 102 of the golf club 100 (as shown in FIG. 8). The expansion of the forcing spring 48 drives the turret 46 and the head 104 a sufficient horizontal distance (without further application of hydraulic force) to remove or at least substantially separate the head 104 from the shaft 102 so that the user need not estimate when and if sufficient heat has been applied to the hosel 106 to break the epoxy bond. Therefore, damage to the integrity of the graphite shaft 102 due to overheating is avoided.

The clamping handle 54 is then rotated in a counter-clockwise direction (opposite the arrow shown in FIG. 7), threadably moving the clamping screw 52 in a 45-degree direction relative to the horizontal, pulling the moving block 56 and the movable upper jaw 58 away from clamping engagement with the shaft 102 of the golf club 100. The golf club 100 is then removed from the golf club shaft remover 10.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention.

What is claimed is:

1. An apparatus for removing a head of a golf club from a shaft of the golf club, comprising:
   - a. a frame;
   - b. a clamping mechanism connected to the frame for securing a golf club; and
   - c. a force mechanism connected to the frame, including:
     - i. a hydraulic piston,
     - ii. a one piece hollow shaft having an open end and a closed end, the closed end connected to the distal end of the piston,
     - iii. a spring having a first end and a second end, the spring residing within the hollow shaft with the first end abutting the closed end of the hollow shaft, and
     - iv. a turret having a smaller diameter portion and a larger diameter portion, the smaller diameter portion inserted in the open end of the hollow shaft and abutting the second end of the spring, the larger diameter portion being external to the shaft and having a slot designed to engage the shaft of the golf club while abutting the head of the golf club.

2. An apparatus for removing a head of a golf club from a shaft of the golf club, comprising:
   - a. a frame including a block having a bore therethrough;
   - b. a hydraulic piston mounted on the frame;
   - c. a clamping mechanism connected to the frame for securing the golf club;
   - d. a one piece hollow shaft extending from the piston and slidably resident within the bore;
   - e. a spring residing within the hollow shaft; and
   - f. a turret in removable communication with the hollow shaft via the spring, the turret engaging the head of the golf club for transferring a force stored in the spring and created by the piston to the head of the golf club.

3. The apparatus of claim 2 comprising an alignment spring for resisting axial movement of the shaft in response to the force created by the piston.

4. The apparatus of claim 2 wherein the turret is coaxially rotatable relative to the shaft to position slots of differing size in engaging alignment with the shaft of the golf club to bear against the head of the golf club.

5. The apparatus of claim 2 wherein the turret partially resides slidably within the hollow shaft and includes a plurality of open slots around the periphery thereof for receiving golf club shafts of differing diameters.

6. The apparatus of claim 4 further comprising an alignment spring connected to the shaft and the frame for resisting axial movement of the shaft in response to the force created by the piston.

7. The apparatus of claim 2 wherein the clamping mechanism is manually actuable.

8. The apparatus of claim 2 wherein the piston is manually actuable.

9. The apparatus of claim 2 wherein the clamping mechanism includes a manually actuable crew for adjusting the magnitude of securing force to a golf club.

10. The apparatus of claim 2 wherein the piston includes a piston handle pivotally movable with respect to the remainder of the piston in a horizontal plane, the horizontal plane being within the longitudinal extremities of the frame.

11. Apparatus for removing a head of a golf club from a shaft of the golf club, comprising:
   - a. a frame;
   - b. a clamp connected to the frame for securing the shaft of a golf club against longitudinal movement; and
   - c. means connected to the frame for applying force longitudinally to the head of the golf club in a direction to separate the head from the shaft, including:
     - i. a hydraulic piston,
     - ii. a machine shaft having one end connected to the piston,
     - iii. a mushroom-shaped turret having a smaller diameter portion and a larger diameter portion, the smaller diameter portion being connected to a second end of said machine shaft, the larger diameter portion having at least one slot formed therein to and thereby abut the head of the golf club, for transferring longitudinally directed force received from said piston via said machine shaft to said golf club head.

12. Apparatus for removing a head of a golf club from a shaft of the golf club, comprising:

a. a frame;

b. a clamping mechanism connected to the frame for securing a golf club; and c. a force generating and applying mechanism connected to the frame, including:

i. a manually powered pumpable hydraulic piston cylinder combination, ii. a machine shaft having a first end connected to the piston, iii. resilient means connected to the machine shaft for limiting shaft and turret longitudinal travel once said golf club head has loosened from said golf club shaft;

iv. a turret having a smaller diameter portion and a larger diameter portion, the smaller diameter portion being axially aligned with said machine shaft and parallel with said golf club shaft, for receiving axially oriented force generated by said piston-cylinder combination from said machine shaft, the larger diameter portion having at least one radially outwardly opening for slidably engaging the golf club shaft and abutting the head of the golf club to apply axially directed force thereto in a direction to separate said golf club head from said golf club shaft.

13. Apparatus for removing a head of a golf club from a shaft of the golf club, comprising:

a. a frame including a block having a bore therethrough;

b. a manually operable hydraulic piston connected to the frame;

c. a clamp connected to the frame for restraining the shaft of the golf club against axial movement;

d. a machine shaft extending from the piston, residing slidably within the frame;

e. a spring residing within the machine shaft; and f. a turret in removable communication with the machine shaft via the spring, the turret engaging the head of the golf club for transferring hydraulic force, stored in the spring and created by manual actuation of the piston, to the head of the golf club in a direction to separate the golf club head from the golf club shaft.

14. Apparatus for removing a head of a golf club from a shaft of the golf club, comprising:

a. a frame;

b. a clamp connected to the frame for securing a golf club shaft thereto; and c. a force mechanism connected to the frame, including:

i. a piston, ii. a one piece hollow shaft having an open end and a closed end, the closed end connected to the piston, iii. a spring having a first end and a second end, the spring residing within the hollow shaft with the first end abutting the closed end of the hollow shaft, and iv. a turret having a smaller diameter portion and a larger diameter portion, the smaller diameter portion inserted in the open end of the hollow shaft and abutting the second end of the spring, the larger diameter portion being external to the shaft and having a slot designed to engage the shaft of the golf club while abutting the head of the golf club for transferring axially directed force indirectly from said piston to said golf club head.

* * * * *